United States Patent
Kwon et al.

(10) Patent No.: US 9,258,709 B2
(45) Date of Patent: Feb. 9, 2016

(54) MOBILE TERMINAL AND CONTROLLING METHOD THEREOF

(71) Applicant: LG ELECTRONICS INC., Seoul (KR)

(72) Inventors: Yunmi Kwon, Seoul (KR); Hyemi Jung, Seoul (KR); Arim Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 145 days.

(21) Appl. No.: 14/209,810

(22) Filed: Mar. 13, 2014

(65) Prior Publication Data

US 2014/0273967 A1    Sep. 18, 2014

(30) Foreign Application Priority Data

Mar. 15, 2013  (KR) .................. 10-2013-0028059

(51) Int. Cl.
| | |
|---|---|
| *H04M 1/66* | (2006.01) |
| *H04W 12/06* | (2009.01) |
| *H04M 1/00* | (2006.01) |
| *H04W 4/20* | (2009.01) |
| *G06F 21/31* | (2013.01) |
| *G06F 21/62* | (2013.01) |
| *G06F 3/0488* | (2013.01) |

(52) U.S. Cl.
CPC .............. *H04W 12/06* (2013.01); *G06F 21/31* (2013.01); *G06F 21/629* (2013.01); *H04M 1/00* (2013.01); *H04W 4/206* (2013.01); *G06F 3/04883* (2013.01)

(58) Field of Classification Search
USPC .............. 455/410, 411, 412.2, 460, 564, 566; 715/828 B, 833, 835, 843 B, 856 B, 859, 715/864
See application file for complete search history.

(56) References Cited

U.S. PATENT DOCUMENTS

| | | | | |
|---|---|---|---|---|
| 2010/0306705 | A1* | 12/2010 | Nilsson | G06F 3/0488 715/835 |
| 2011/0316797 | A1* | 12/2011 | Johansson | G06F 3/04883 345/173 |
| 2012/0302167 | A1* | 11/2012 | Yun | G06F 3/04883 455/41.2 |
| 2013/0007665 | A1 | 1/2013 | Chaudhri et al. | |
| 2013/0053105 | A1* | 2/2013 | Lee | H04M 1/673 455/565 |
| 2013/0150019 | A1* | 6/2013 | Lee | G09G 5/003 455/419 |
| 2013/0225118 | A1* | 8/2013 | Jang | H04W 4/22 455/404.2 |
| 2013/0244574 | A1* | 9/2013 | Okuno | H04M 1/67 455/26.1 |
| 2014/0038557 | A1* | 2/2014 | Kim | H04W 12/06 455/411 |
| 2014/0038558 | A1* | 2/2014 | Kim | H04W 12/08 455/411 |

OTHER PUBLICATIONS

Samsung, "Samsung Rugby Smart Mobile Phone User Manual," XP055116760, 2012, 213 pages.
European Patent Office Application Serial No. 14159688.2, Search Report dated Jul. 14, 2014, 5 pages.

* cited by examiner

*Primary Examiner* — Dai A Phuong
(74) *Attorney, Agent, or Firm* — Lee, Hong, Degerman, Kang & Waimey

(57) ABSTRACT

A mobile terminal and controlling method therein are disclosed, by which a memo can be written and utilized conveniently in a state that an access to the mobile terminal is restricted in part. The present invention includes entering a lock screen for restricting at least one partial function of the mobile terminal, writing a memo on the lock screen in response to an input of a $1^{st}$ command, and if user authentication is performed in response to an input of a $2^{nd}$ command, coping with an event occurring until cancellation of the display of the lock screen using the memo.

14 Claims, 14 Drawing Sheets

MOBILE TERMINAL AND CONTROLLING METHOD THEREOF

Pursuant to 35 U.S.C. §119(a), this application claims the benefit of earlier filing date and right of priority to Korean Application No. 10-2013-0028059, filed on Mar. 15, 2013, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for writing and utilizing a memo conveniently in a state that an access to the mobile terminal is restricted in part.

2. Discussion of the Related Art

Generally, terminals can be classified into mobile/portable terminals and stationary terminals. The mobile terminals can be further classified into handheld terminals and vehicle mount terminals according to possibility of user's direct portability.

As functions of the terminal are getting diversified, the terminal tends to be implemented as a multimedia player provided with composite functions such as photographing of photos or videos, playback of music or video files, game play, broadcast reception and the like for example.

To support and increase the terminal functions, it may be able to consider the improvement of structural parts and/or software parts of the terminal Recently, as a mobile terminal of a smart type capable of storing various kinds of user's personal informations is released and used, a lock screen tends to be increasingly used due to a problem of privacy protection. While a lock screen is enabled, limited functions can be activated only until a specific command for cancelling a locked screen status is inputted. However, while prescribed functions are restricted at least like a locked screen status, a user may need to conveniently write a memo or a third party may need to write a memo for a user of a mobile terminal Hence, the demand for methods of writing such memos and utilizing the written memos is rising.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which any one can write a memo conveniently in a state that prescribed functions of the mobile terminal are restricted at least.

In particular, one object of the present invention is to provide a mobile terminal and controlling method thereof, by which a written memo can be utilized for an automatic handling through a prescribed authentication procedure in case of an event occurrence.

Another object of the present invention is to provide a mobile terminal and controlling method thereof, by which a previously written memo can be utilized in various ways in a state that function restriction is cancelled.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a touchscreen configured to display a lock screen for restricting at least one partial function of the mobile terminal and a controller, if a user authentication is successfully performed in response to a $2^{nd}$ command inputted after writing a memo on the lock screen in response to an input of a $1^{st}$ command, coping with an event occurring until cancellation of the lock screen using the memo.

In another aspect of the present invention, a method of controlling a mobile terminal includes the steps of entering a lock screen for restricting at least one partial function of the mobile terminal, writing a memo on the lock screen in response to an input of a $1^{st}$ command, and if user authentication is performed in response to an input of a $2^{nd}$ command, coping with an event occurring until cancellation of the lock screen using the memo.

Accordingly, the present invention provides the following effects and/or advantages.

First of all, although prescribed functions of a mobile terminal are restricted at least, a memo can be written through a prescribed command input.

Secondly, a user can enable an automatic reply to be performed or can enable the mobile terminal to operate in a specific state, through a prescribed authentication procedure in response to an occurrence of a communication event using a substance of a written memo.

Thirdly, while a function restriction is cancelled, a substance of a previously written memo can be utilized as an input information on a specific application.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used to denote elements in order to facilitate the disclosure only. Therefore, significant meanings or roles are not given to the suffixes themselves, and it is understood that the suffixes 'module', 'unit' and 'part' can be used together or interchangeably.

Features of embodiments of the present invention are applicable to various types of terminals. Examples of such terminals include mobile terminals, such as mobile phones, user equipment, smart phones, mobile computers, digital broadcast terminals, personal digital assistants, portable multimedia players (PMP) and navigators. However, by way of non-limiting example only, further description will be with regard to a mobile terminal 100, and it should be noted that such teachings may apply equally to other types of terminals such as digital TV, desktop computers and so on.

Figure 1:
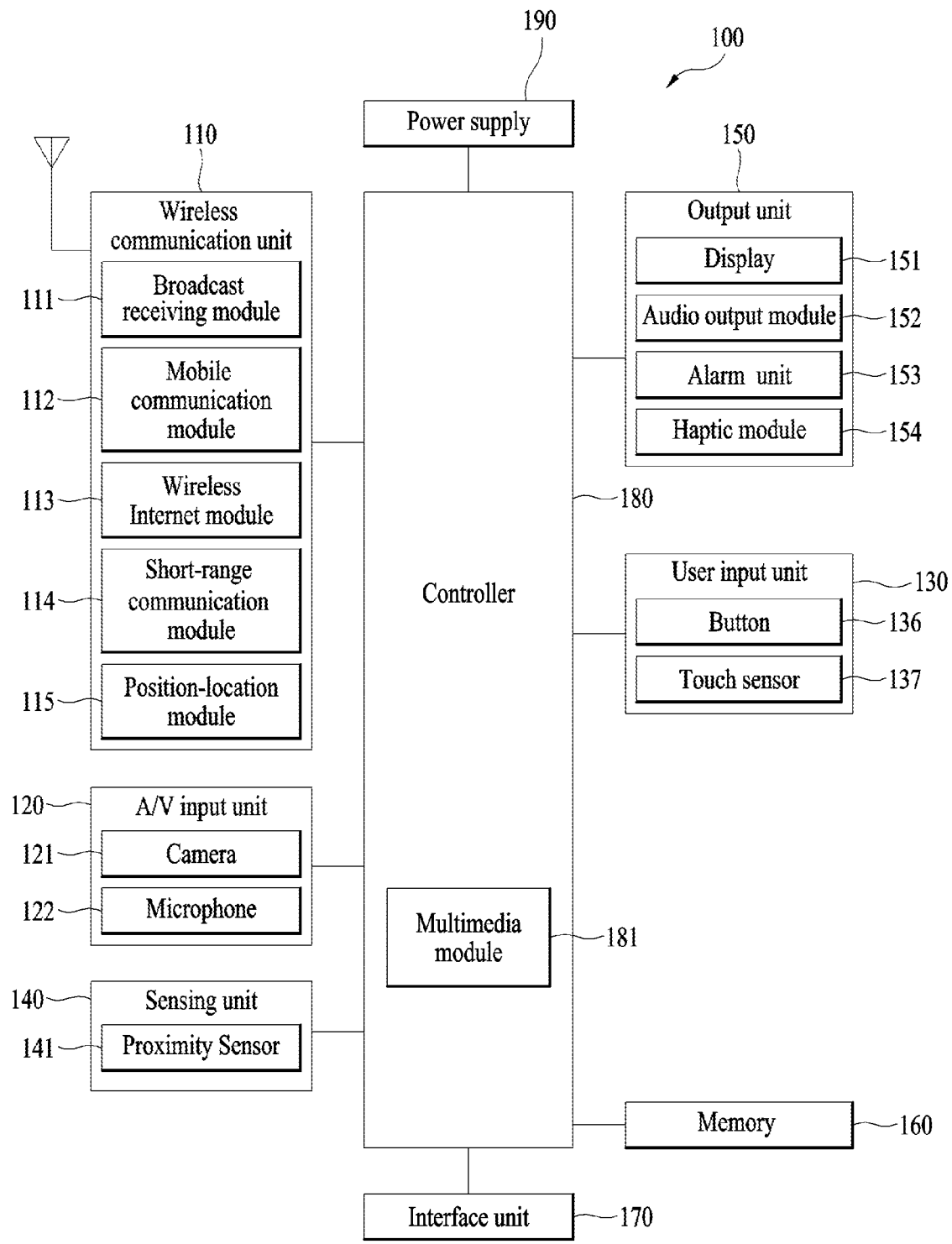
FIG. 1 is a block diagram of a mobile terminal according to one embodiment of the present invention.

FIG. 1 is a block diagram of a mobile terminal 100 in accordance with an embodiment of the present invention. With reference to FIG. 1, the mobile terminal 100 includes a wireless communication unit 110, an AN (audio/video) input unit 120, a user input unit 130, a sensing unit 140, an output unit 150, a memory 160, an interface unit 170, a controller 180, and a power supply unit 190. FIG. 1 shows the mobile terminal 100 having various components, but implementing all of the illustrated components is not a requirement. More or fewer components may be implemented according to various embodiments.

The wireless communication unit 110 typically includes one or more components which permit wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided in the mobile terminal 100 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may be configured to receive broadcast signals transmitted from various types of broadcast systems. By nonlimiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T).

Optionally, the broadcast receiving module 111 can be configured to be suitable for other broadcasting systems as well as the above-noted digital broadcasting systems.

The broadcast signal and/or broadcast associated information received by the broadcast receiving module 111 may be stored in a suitable device, such as the memory 160.

The mobile communication module 112 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 113 supports Internet access for the mobile terminal 100. This module may be internally or externally coupled to the mobile terminal 100. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 113 may be considered as being a kind of the mobile communication module 112 to perform the wireless Internet access via the mobile communication network.

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™ to name a few.

The position-location module 115 identifies or otherwise obtains the location of the mobile terminal 100. According to one embodiment, this module may be implemented with a global positioning system (GPS) module. The GPS module 115 can precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and time information are then amended (or corrected) using another satellite. In addition, the GPS module 115 can calculate speed information by continuously calculating a real-time current location.

With continued reference to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Furthermore, the processed image frames can be displayed on the display 151.

The image frames processed by the camera 121 can be stored in the memory 160 or can be transmitted to an external recipient via the wireless communication unit 110. Optionally, at least two cameras 121 can be provided in the mobile terminal 100 according to the environment of usage.

The microphone 122 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 112 in a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, and a jog switch. FIG. 1 also illustrates the user input unit 130 can include a button 136 (hard or soft button) and a touch sensor 137.

The sensing unit 140 provides sensing signals for controlling operations of the mobile terminal 100 using status measurements of various aspects of the mobile terminal. For instance, the sensing unit 140 may detect an open/closed status of the mobile terminal 100, the relative positioning of components (e.g., a display and keypad) of the mobile terminal 100, a change of position (or location) of the mobile terminal 100 or a component of the mobile terminal 100, a presence or absence of user contact with the mobile terminal 100, and an orientation or acceleration/deceleration of the mobile terminal 100.

As an example, a mobile terminal 100 configured as a slide-type mobile terminal is considered. In this configuration, the sensing unit 140 may sense whether a sliding portion of the mobile terminal is open or closed. According to other examples, the sensing unit 140 senses the presence or absence of power provided by the power supply unit 190, and the presence or absence of a coupling or other connection between the interface unit 170 and an external device. According to one embodiment, the sensing unit 140 can include a proximity sensor 141.

The output unit 150 generates output relevant to the senses of sight, hearing, and touch. Furthermore, the output unit 150 includes the display 151, an audio output module 152, an alarm unit 153, a haptic module 154, and a projector module 155.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the displays can be implemented in a transparent or optical transmittive type, i.e., a transparent display. A representative example of the transparent display is the TOLED (transparent OLED). A rear configuration of the display 151 can be implemented as the optical transmittive type as well. In this configuration, a user may be able to see an object located at the rear of a terminal body on a portion of the display 151 of the terminal body.

At least two displays 151 can be provided in the mobile terminal 100 in accordance with one embodiment of the mobile terminal 100. For instance, a plurality of displays can be arranged to be spaced apart from each other or to form a single body on a single face of the mobile terminal 100. Alternatively, a plurality of displays can be arranged on different faces of the mobile terminal 100.

If the display 151 and a sensor for detecting a touch action (hereinafter called 'touch sensor') are configured as a mutual layer structure (hereinafter called 'touchscreen'), the display 151 is usable as an input device as well as an output device. In this instance, the touch sensor can be configured as a touch film, a touch sheet, or a touchpad.

The touch sensor can be configured to convert pressure applied to a specific portion of the display 151 or a variation of capacitance generated from a specific portion of the display 151 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 180. Therefore, the controller 180 is made aware when a prescribed portion of the display 151 is touched.

Referring to FIG. 1, a proximity sensor 141 can be provided at an internal area of the mobile terminal 100 enclosed by the touchscreen or around the touchscreen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 141 is more durable than a contact type sensor and also has utility broader than the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touchscreen includes the electrostatic capacity proximity sensor, it is configured to detect the proximity of a pointer using a variation of an electric field according to the proximity of the pointer. In this configuration, the touchscreen (touch sensor) can be considered as the proximity sensor.

For clarity and convenience of explanation, an action for enabling the pointer approaching the touchscreen to be recognized as placed on the touchscreen may be named 'proximity touch' and an action of enabling the pointer to actually come into contact with the touchscreen may be named 'contact touch'. In addition, a position, at which the proximity touch is made to the touchscreen using the pointer, may mean a position of the pointer vertically corresponding to the touchscreen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touchscreen.

The audio output module 152 functions in various modes including a call-receiving mode, a call-placing mode, a recording mode, a voice recognition mode, and a broadcast reception mode to output audio data which is received from the wireless communication unit 110 or is stored in the memory 160. During operation, the audio output module 152 outputs audio relating to a particular function (e.g., call received, message received). The audio output module 152 may be implemented using one or more speakers, buzzers, other audio producing devices, and combinations of these devices.

The alarm unit 153 outputs a signal for announcing the occurrence of a particular event associated with the mobile terminal 100. Typical events include a call received, a message received and a touch input received. The alarm unit 153 can output a signal for announcing the event occurrence by way of vibration as well as video or audio signal. The video or audio signal can be output via the display 151 or the audio output module 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. The strength and pattern of the vibration generated by the haptic module 154 are controllable. For instance, different vibrations can be output in a manner of being synthesized together or can be output in sequence.

The haptic module 154 can generate various tactile effects as well as the vibration. For instance, the haptic module 154 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 154 can be implemented to enable a user to sense the tactile effect through a muscle sense of a finger or an arm as well as to transfer the tactile effect through direct contact. Optionally, at least two haptic modules 154 can be provided in the mobile terminal 100 in accordance with an embodiment of the mobile terminal 100.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 160.

Moreover, data for various patterns of vibration and/or sound output in response to a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 100 can operate in association with a web storage for performing a storage function of the memory 160 on the Internet.

The interface unit 170 may be implemented to couple the mobile terminal 100 with external devices. The interface unit 170 receives data from the external devices or is supplied with power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 100 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, and video calls. The controller 180 may include a multimedia module 181 that provides multimedia playback. The multimedia module 181 may be configured as part of the controller 180, or implemented as a separate component.

Moreover, the controller 180 can perform a pattern (or image) recognizing process for recognizing a writing input and a picture drawing input carried out on the touchscreen as characters or images, respectively.

The power supply unit 190 provides power required by various components of the mobile terminal 100. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 180.

Figure 2:
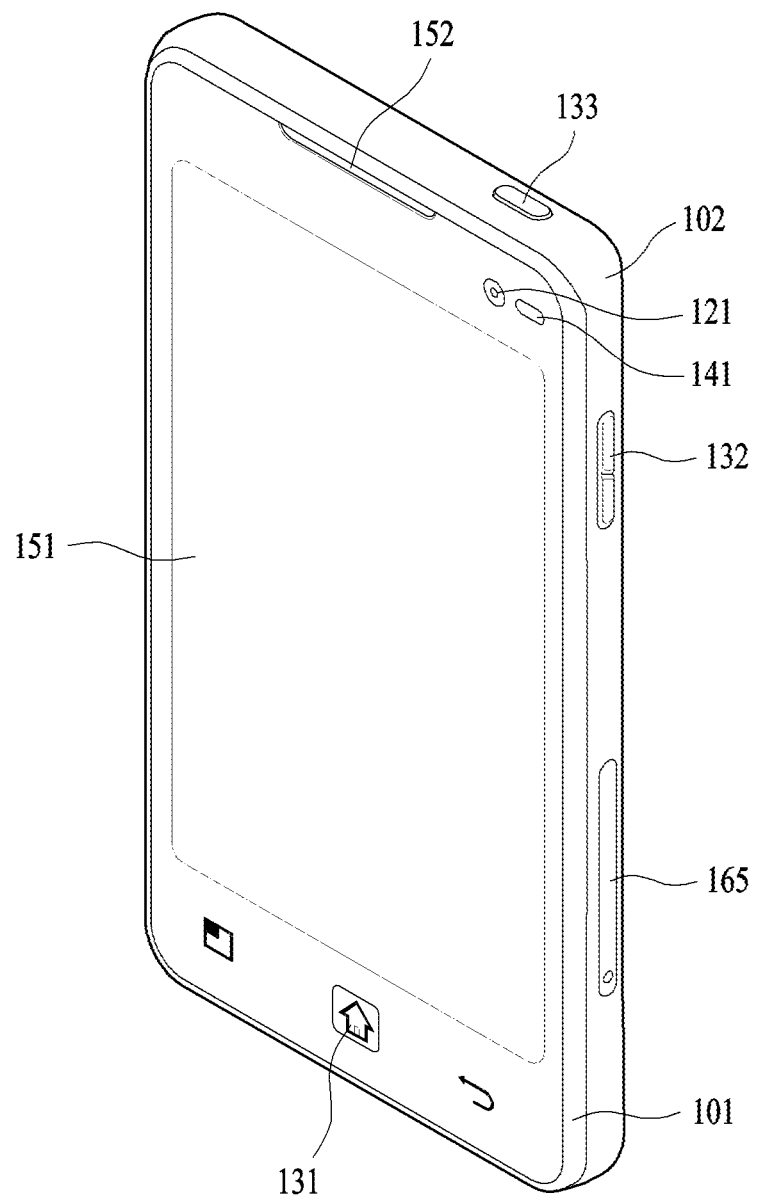
FIG. 2 is a front perspective diagram of a mobile terminal according to one embodiment of the present invention.

FIG. 2 is a front perspective view of a mobile terminal according to one embodiment of the present invention. The mobile terminal 100 illustrated in FIG. 2 has a bar type terminal body. However, the mobile terminal 100 may be implemented in a variety of different configurations. Examples of such configurations include folder-type, slide-type, rotational-type, swing-type and combinations thereof. For ease of description, the following disclosure will primarily relate to a bar-type mobile terminal 100. However, the present invention applies equally to other types of mobile terminals.

Referring to FIG. 2, the mobile terminal 100 includes a case (a casing, housing, or cover) constituting an exterior of the mobile terminal In the present embodiment, the case can be divided into a front case 101 and a rear case 102. Various electric/electronic parts are loaded in a space (volume) provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output module 152, a camera 121, manipulating units 131 and 132, a microphone 122, and an interface unit 170 can be provided at the terminal body, and more particularly, at the front case 101. Manipulating units 131 and 132 are part of the user input unit 130.

The display 151 occupies most of a main face of the front case 101. The audio output module 152 and the camera 121 are provided at an area adjacent to an end portion of the display 151, while the manipulating unit 131 and the microphone 122 are provided at an area adjacent to the other end portion of the display 151. The manipulating unit 132 and the interface unit 170 can be provided at lateral sides of the front and rear cases 101 and 102. Another manipulating unit 133 can be provided on a top portion of the case 102.

The user input unit 130 is manipulated (operated) to receive a command for controlling an operation of the terminal 100. Furthermore, the user input unit 130 may include a plurality of manipulating units 131 and 132. The manipulating units 131 and 132 can be referred to as a manipulating portion and may adopt any tactile mechanism that enables a user to perform a manipulation action by touch.

Content input by manipulating units 131 and 132 can be divided between the two. For instance, a command such as start, end, and scroll is input to first manipulating unit 131. Furthermore, a command for a volume adjustment of sound output from the audio output module 152, or a command for a switching to a touch recognizing mode of the display 151 can be input to second manipulating unit 132.

Meanwhile, such a graphic for pointing at a specific object on a display unit or selecting a menu from the display unit as an arrow, a finger and the like is called a pointer or a cursor. However, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical means for performing a touch, a proximity touch, a gesture and the like as a finger, a stylus pen and the like is named a pointer.

Writing & Utilizing Memo in State that function of Mobile Terminal is Restricted According to one embodiment of the present invention, proposed are a mobile terminal and controlling method thereof suitable for a user to conveniently write and utilize a memo variously in a state that at least one function of the mobile terminal is restricted. In the present specification, one example of restricting at least one function of a mobile terminal is assumed as a state that a lock screen is enabled. Of course, it is apparent to those skilled in the art that a state, mode or screen for providing a function of restricting at least one function of a mobile terminal until applying a command input of a specific type is applicable to the present invention despite that its name or operating mechanism is different.

In the following description, a method of writing and utilizing a memo according to the present invention is described with reference to FIG. 3.

Figure 3:
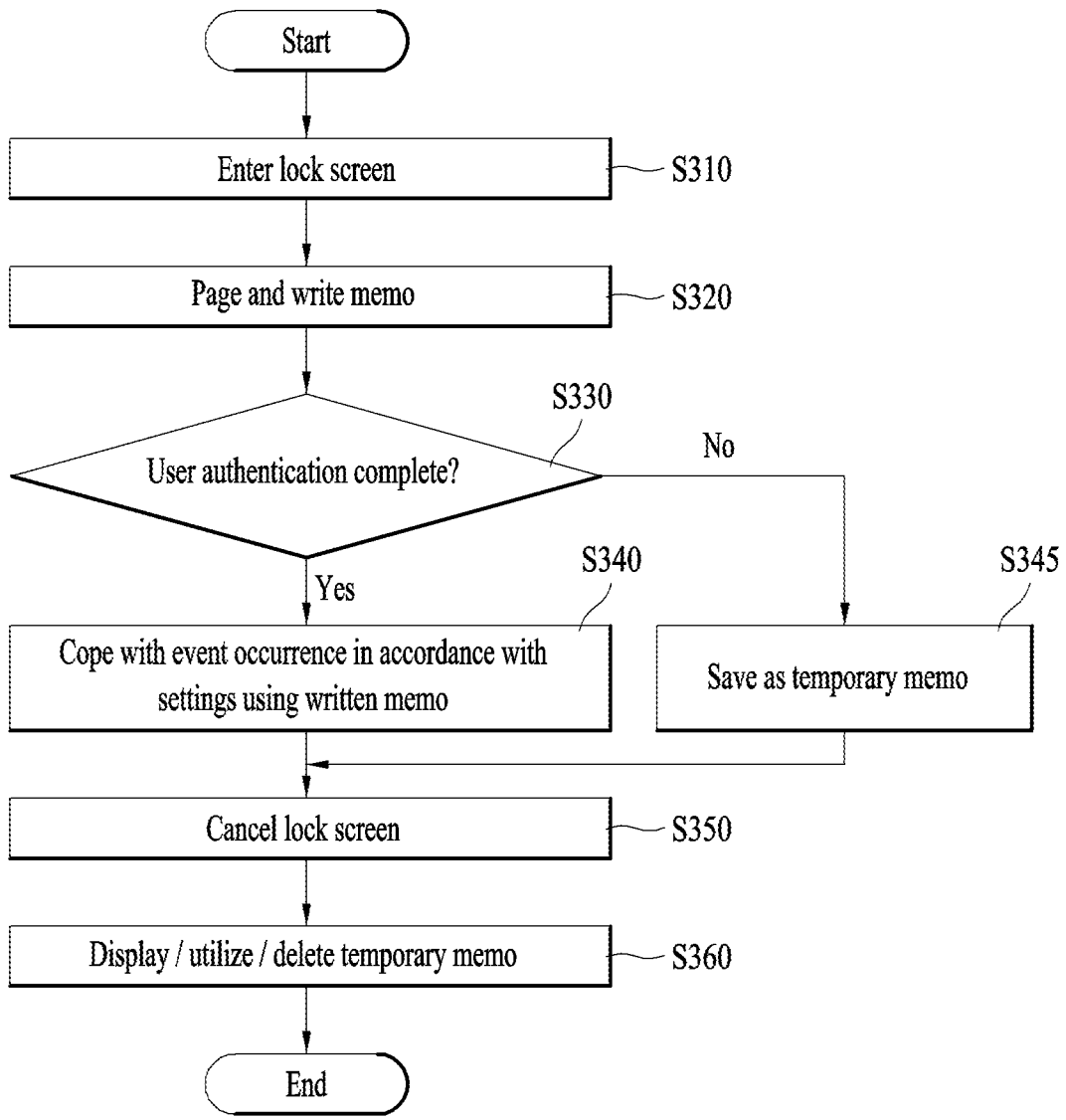
FIG. 3 is a flowchart for one example of a method of writing and utilizing a memo in a mobile terminal according to one embodiment of the present invention.

FIG. 3 is a flowchart for one example of a method of writing and utilizing a memo in a mobile terminal according to one embodiment of the present invention.

Referring to FIG. 3, the controller 180 can display a lock screen on the touchscreen [S301]. In particular, if a turned-off touchscreen is turned on again by settings or a command input of a prescribed type for paging the lock screen is applied by a user, the controller 180 can display the lock screen.

In general, restricted informations indicating prescribed operating statuses of a mobile terminal an event occurrence and the like and preset objects including an emergency call function, a locked screen unlocking means and the like can be displayed on a lock screen.

While the lock screen is displayed, if a memo function paging command is inputted through the touchscreen 151 and/or the sensing unit 140, the controller 180 controls a user interface for writing a memo to be paged on the lock screen and is then able to receive an input of a memo substance through the user interface [S320]. In this case, the memo substance may be inputted as a text through a virtual keypad or voice recognition, an image through a drawing tool, a handwriting recognition or the like, or a combination of the text and image.

In doing so, a user currently writing a memo can select whether to perform an authentication procedure [S330]. In this case, the authentication procedure may mean a procedure for determining whether a signal inputted through at least one of a password input, a touch-drag pattern input, a fingerprint recognition, a voice recognition, a face recognition and the like matches an authentication information by comparison.

Once the user authentication is complete, the controller 180 can respond to (or, cope with) the settings using the memo written in the event occurrence until the locked screen status or the authenticated status is cancelled by the user. In this case, the settings may include the settings for a type of an event to cope with using the memo or an application related to the event type and the settings for an operating mode (e.g., vibration, bell sound, silence, etc.) until the cancellation of the locked screen status/ authenticated status.

If the user authentication is not performed, the written memo can be saved as a temporary memo in the memory 160 [S345]. In this case, the temporary memo is the memo that is discriminated from a memo saved through a dedicated application for recording a memo. Of course, even if the operation of the step S340 is performed, the written memo can be saved as the temporary memo.

Thereafter, if the locked screen status is cancelled [S350], the controller 180 can display the saved temporary memo in response to a user's command input, save the temporary memo through a memo application, use a memo substance as an input information for another application, or delete the temporary memo [S360].

In the following description, methods of paging a memo function in a locked screen status are explained with reference to FIG. 4 and FIG. 5.

Figure 4:
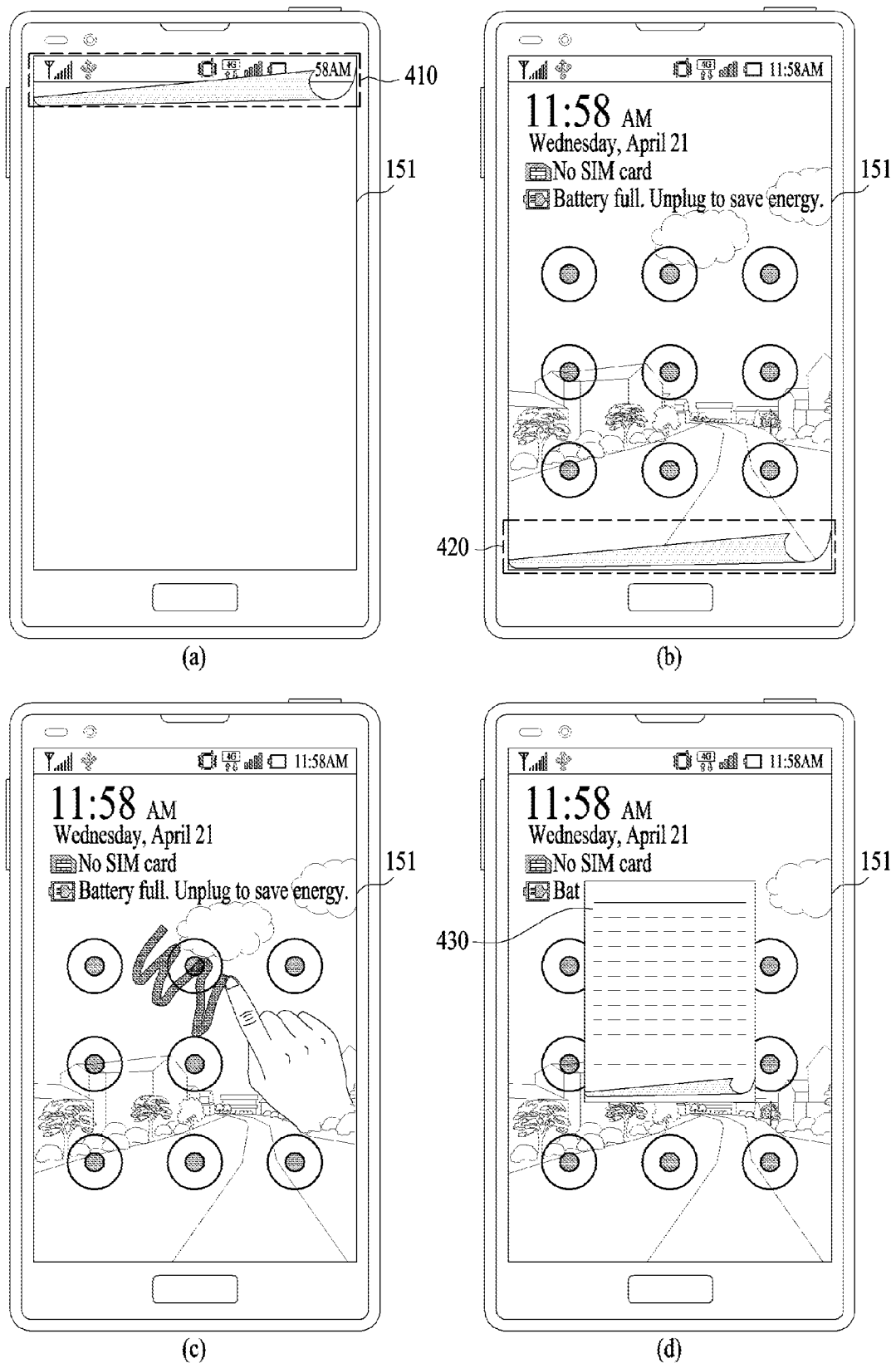
FIG. 4 is a diagram for one example of a method of paging a memo function when a lock screen is displayed in a mobile terminal according to one embodiment of the present invention.

FIG. 4 is a diagram for one example of a method of paging a memo function when a lock screen is displayed in a mobile terminal according to one embodiment of the present invention. In the following drawings including FIG. 4, assume that an indicator region for displaying an operating state of the mobile terminal is displayed on a top end of a lock screen and that a region for receiving an input of a touch-drag pattern is arranged as a means for cancelling the lock screen at a center of the lock screen.

Referring to FIG. 4 (a), while one of the volume key 132, the power key 133 and the like is pressed, if the mobile terminal is inclined, the controller 180 detects an inclined state through the sensing unit 140 and is then able to control a prescribed visual effect (e.g., a shape of a rolled-up paper, etc.) to be displayed by activating a partial top region 410 of the touchscreen only. For another instance, referring to FIG. 4 (b), while a lock screen is displayed, in a touch input of dragging a bottom region 420 of the touchscreen 151 upward is detected, a prescribed visual effect can be displayed. While the visual effect is displayed, if each of the regions 410 and 420 is selected or a touch input of a specific pattern having nothing to do with a lock screen cancellation is applied [FIG. 4 (c)], a memo sheet 430 for displaying a memo substance thereon can be displayed on the lock screen [FIG. 4 (d)]. In doing so, if the memo sheet 430 is selected, a virtual keypad (not shown in the drawing) can be displayed. If a touch-drag input is detected from a memo sheet region, a visual effect corresponding to the detected trace can be recorded as a memo [i.e., handwriting recognition].

Of course, an icon (not shown in the drawing) for paging the memo sheet 430 can be arranged on the lock screen.

In the following description, a method of paging a memo in case of an event occurrence is explained with reference to FIG. 5.

Figure 5:
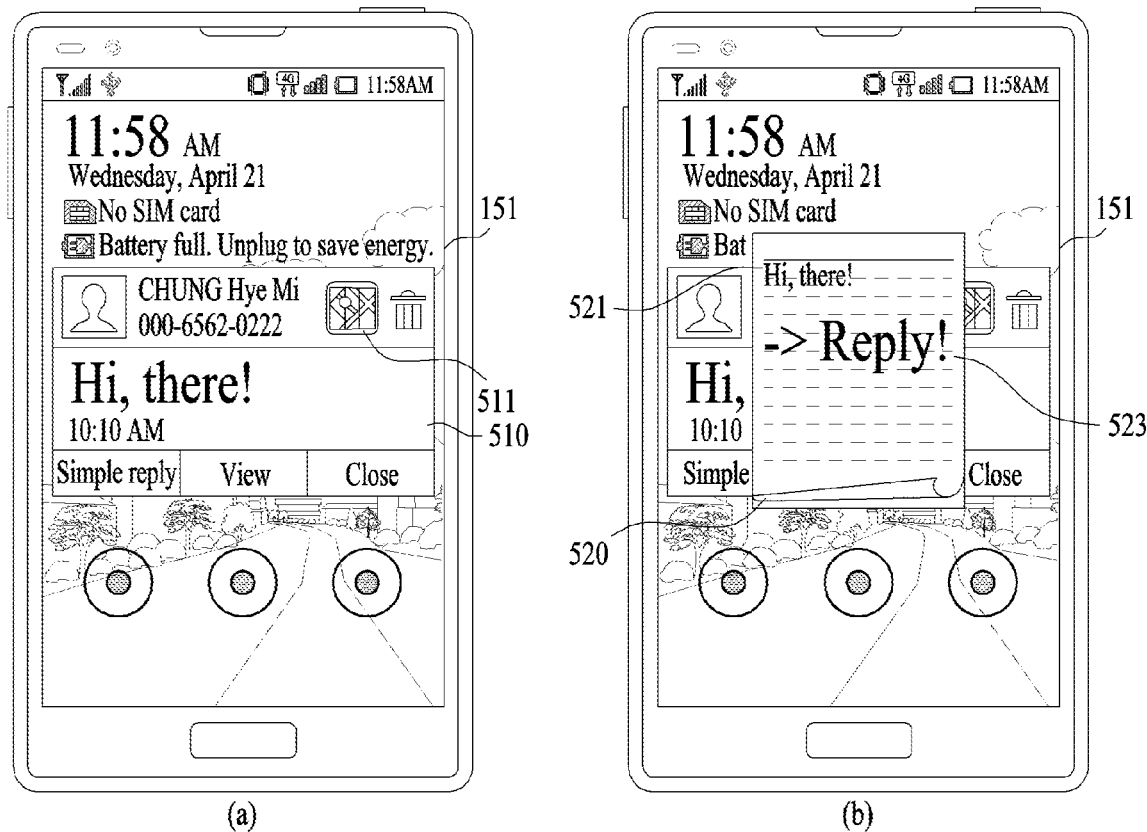
FIG. 5 is a diagram for one example of a method of paging a memo function in response to an event occurrence when a lock screen is displayed in a mobile terminal according to one embodiment of the present invention.

FIG. 5 is a diagram for one example of a method of paging a memo function in response to an event occurrence when a lock screen is displayed in a mobile terminal according to one embodiment of the present invention.

In FIG. 5, assume a case that a substance of a message is displayed on a lock screen if the message arrives. Referring to FIG. 5 (a), as a text message arrives, a popup window 510 including a substance of the received message can be displayed on a lock screen. In doing so, a memo writing icon 511 is displayed within the popup window 510. If the corresponding icon 511 is selected, referring to FIG. 5 (b), a memo pad 520 can be displayed. In doing so, a substance 521 of the text message can be automatically contained in the memo pad 520. And, a memo substance 523 corresponding to a user's input may be displayed thereon. Alternatively, irrespective of a presence or non-presence of the icon 511, if a specific pattern is inputted to the popup window 510, a separate memo window (not shown in the drawing) may pop up to enable a memo writing or the corresponding pattern may be laid on the received message by turning into a memo.

In the following description, a method of saving a written memo is explained with reference to FIG. 6.

Figure 6:
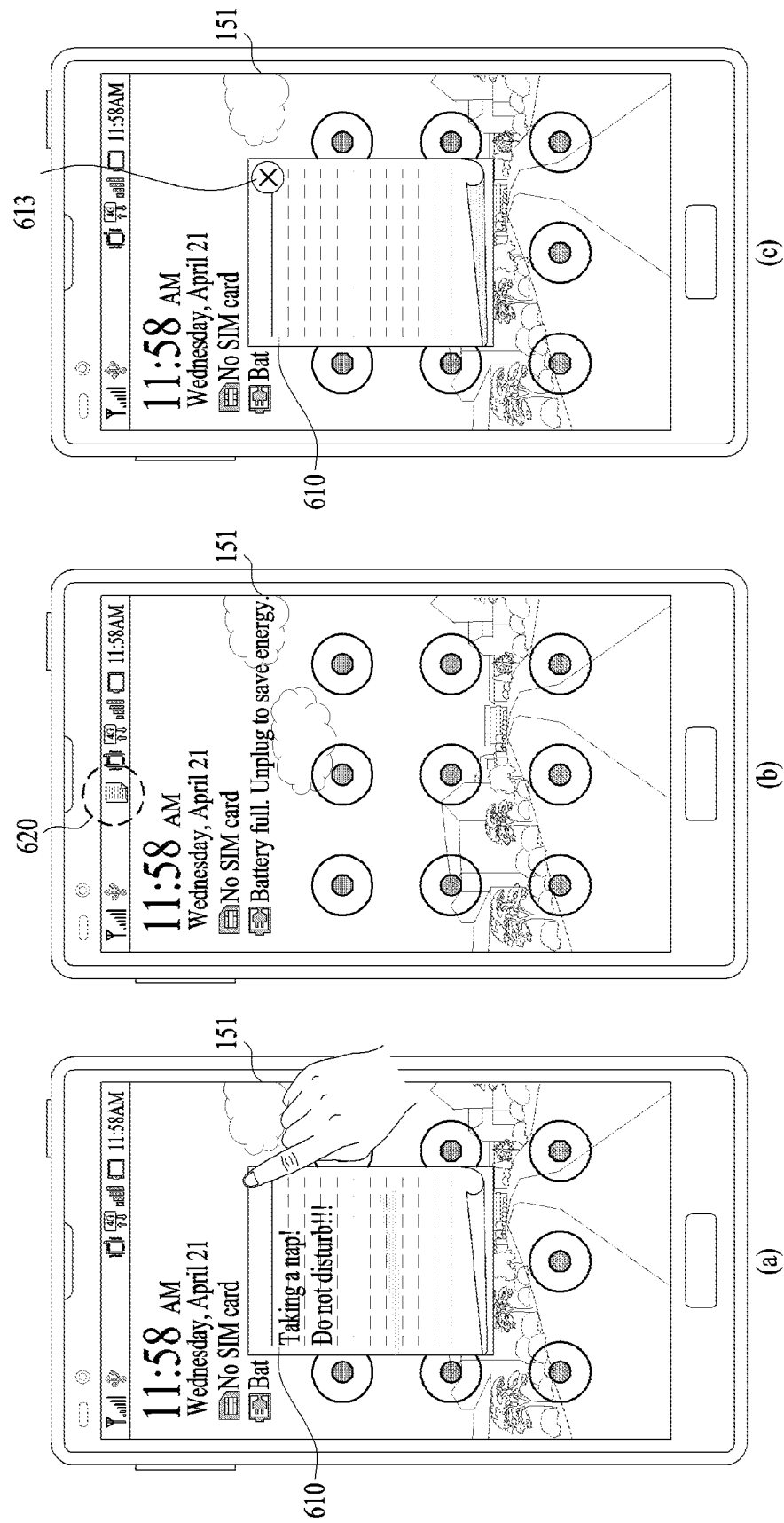
FIG. 6 is a diagram for one example of a method of saving a written memo as a temporary memo in a mobile terminal according to one embodiment of the present invention.

FIG. 6 is a diagram for one example of a method of saving a written memo as a temporary memo in a mobile terminal according to one embodiment of the present invention.

In FIG. 6, assume a case that, after a memo pad has been paged by one of the aforementioned methods, a memo writing job is completed through the memo pad. On this assumption, if the memo pad 610 is dragged toward an indicator displayed on the touchscreen 151, i.e., upward [FIG. 6 (a)], a memo indicator 620 indicating that a temporary memo is saved can be displayed on an indicator region as soon as the memo pad 610 disappears [FIG. 6 (b)].

On the other hand, while no substance is written on the memo pad 610, if a touch input of a specific type (e.g., a long touch) is detected from the memo pad 610, referring to FIG. 6 (c), the controller 180 can control a memo pad delete icon 613 to be displayed. Subsequently, if the memo pad delete icon 613 is selected, the memo pad 610 may disappear from the lock screen.

Meanwhile, a written memo can be saved as a temporary memo using a power key (not shown in the drawing). For instance, after a memo writing job has been completed, if the touchscreen is turned off by manipulating the power key, a corresponding memo can be saved as a temporary memo. Thereafter, if the power key is manipulated again, a blank memo sheet can be displayed automatically. Yet, after the memo writing job has been completed, the touchscreen is automatically turned off according to expiration of a prescribed time. In doing so, if the power key is manipulated again, a corresponding memo may be maintained in a finally written state instead of being saved temporarily.

In the following description, a method of performing a user authentication procedure and a method of cancelling the user authentication procedure are explained with reference to FIG. 7 and FIG. 8.

Figure 7:
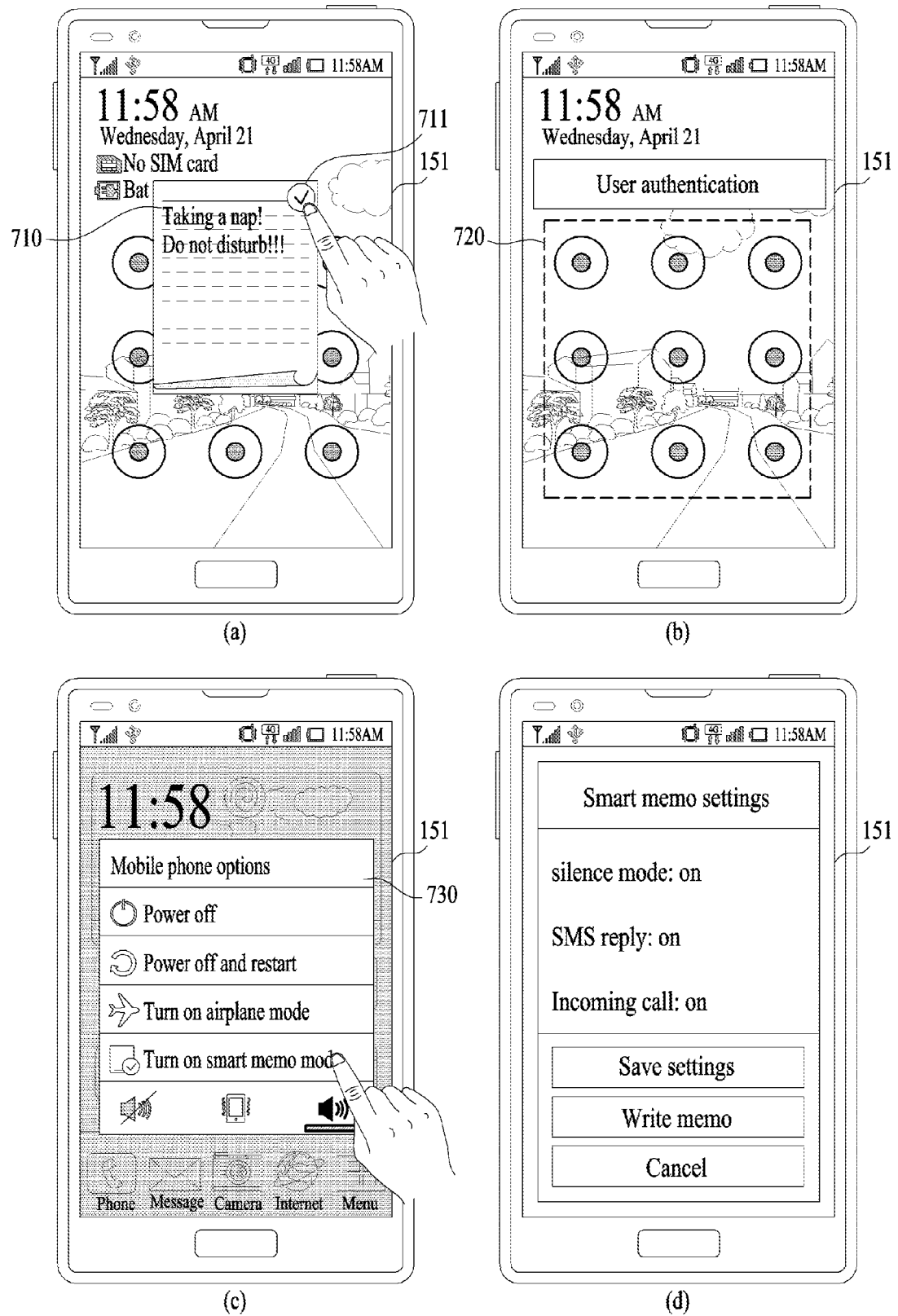
FIG. 7 is a diagram for one example of a process for performing a user authentication procedure in a mobile terminal according to one embodiment of the present invention.
Figure 8:
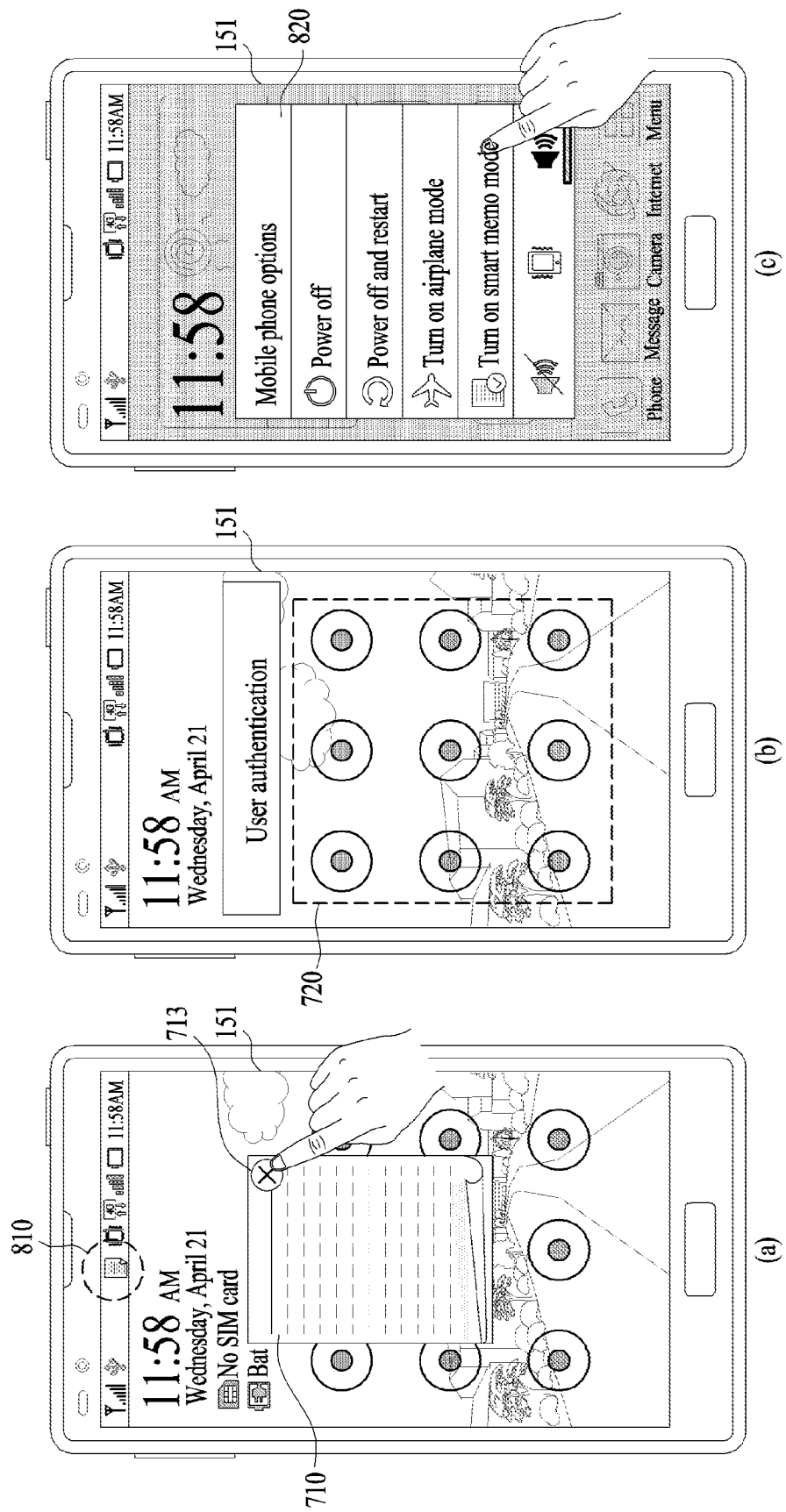
FIG. 8 is a diagram for one example of a process for cancelling a user authentication procedure in a mobile terminal according to one embodiment of the present invention.

FIG. 7 is a diagram for one example of a process for performing a user authentication procedure in a mobile terminal according to one embodiment of the present invention. And, FIG. 8 is a diagram for one example of a process for cancelling a user authentication procedure in a mobile terminal according to one embodiment of the present invention.

In FIG. 7, assume a case that, after a memo pad has been paged by one of the aforementioned methods, a memo writing job is completed through the memo pad. On this assumption, referring to FIG. 7 (*a*), in case that a touch input (e.g., a ling touch) of a specific type is detected from a memo pad 710, the controller 180 can control a user authentication icon 711 to be displayed on the memo pad 710.

If the user authentication icon 711 is selected, an authentication means for user authentication can be displayed. FIG. 7 (*b*) shows a pattern input region 720 identical to a cancelling means for cancelling a lock screen is displayed as an example of an authentication means. In doing so, if a correct pattern is inputted, the controller 180 can utilize a substance of a written memo in accordance with the settings for handling an event that will occur in the future.

On the other hand, how to utilize a memo for a prescribed event can be determined through a setting menu paging. As an example of a setting menu paging method, it is able to use a popup window 730 displayed if the power key is pressed long [FIG. 7 (*c*)]. In this case, power related menus are included in the popup window 720 and a setting menu paging item may be included in a bottom end of the popup window 730 as well. If the setting menu paging item is selected, referring to FIG. 7 (*d*), a setting menu can be displayed. In the setting menu shown in FIG. 7 (*d*) for example, it is able to set up whether to operate in silence mode in utilizing a memo through user authentication, whether to send a reply to a text message using a memo substance, whether to transmit a memo substance by TTS in case of receiving an incoming call signal, etc., which are just exemplary. Of course, more or less function can be set up through the setting menu. For clarity, in the following description, a user authenticated memo shall be named a smart memo and a state corresponding to an event using the smart memo shall be named a smart memo mode.

A case that a user intends to cancel a smart memo mode is described in detail with reference to FIG. 8 as follows. As the user authentication is complete, referring to FIG. 8 (*a*), an indicator 810 can be displayed on the indicator region to indicate that the smart memo mode is enabled. If the smart memo mode is enabled or a smart memo exists, an icon or image corresponding to the smart memo can be always displayed on the top to avoid being blocked by other objects. Optionally, if the icon or image overlaps with another object, the controller 180 can change a location of the icon or image corresponding to the smart memo automatically.

If the user applies a touch input of a specific type (e.g., a long touch input) again, the controller 180 can control an icon 713, which is provided to cancel the smart memo mode, to be displayed on the memo pad 710. If the icon 713 is selected, referring to FIG. 8 (*b*), a user authentication procedure can be performed. On the other hand, an item for cancelling the smart memo mode can be displayed on a popup window 820. In particular, after the smart memo mode has been enabled, if the power key is pressed long, the popup window 820 can be displayed. Alternatively, of course, an item for cancelling the smart mode can be displayed through a separate manipulation of such a menu as a configuration setting menu provided by an operating system and the like.

In this case, in the indicator region, the indicator 620 indicating the presence of the temporary memo and the indicator 810 indicating that the smart memo is set may differ from each other in at least one portion of configuration or shape.

In the following description, after a smart memo mode has been enabled, a detailed operation of the mobile terminal is explained in detail with reference to FIG. 9.

Figure 9:
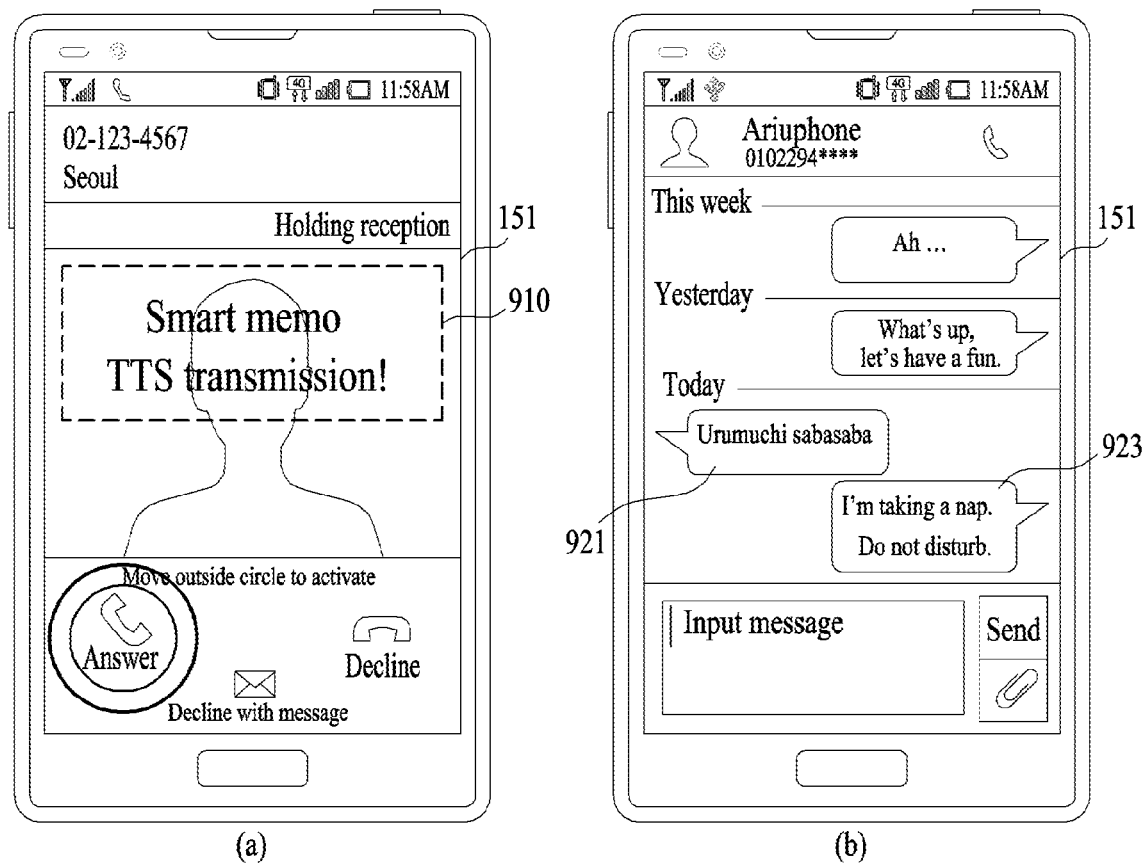
FIG. 9 is a diagram for one example of a method of processing an occurring event in accordance with an enabled smart memo mode in a mobile terminal according to one embodiment of the present invention.

FIG. 9 is a diagram for one example of a method of processing an occurring event in accordance with an enabled smart memo mode in a mobile terminal according to one embodiment of the present invention.

Referring to FIG. 9 (*a*), as an incoming call signal is received, the controller 180 selects a call answering and is then able to transmit a memo substance as an audio by TTS (text-to-speech) scheme. In doing so, a popup window 910 can be displayed to indicate that such a function is currently performed. If a memo is not suitable for TTS (e.g., a case that the memo contains an image, a case that a handwriting recognition of the memo is impossible, etc.), the controller 180 rejects the incoming call and is then able to send the corresponding memo as an image to a caller.

On the other hand, referring to FIG. 9 (*b*), if a text message is received, the controller 180 can control a reply 923 to be automatically sent using a memo substance.

Besides, if an SNS (social network service) update notification of a preset account is received by the mobile terminal, a substance corresponding to a memo can be uploaded to the corresponding SNS account.

Meanwhile, if a silence mode operation is set up by the settings, the controller 180 can control a bell sound or vibration not to be outputted in accordance with a reception of an incoming call signal or a text message.

In the following description, a case of cancelling a lock screen after saving a temporary memo is explained in detail with reference to FIG. 10.

Figure 10:
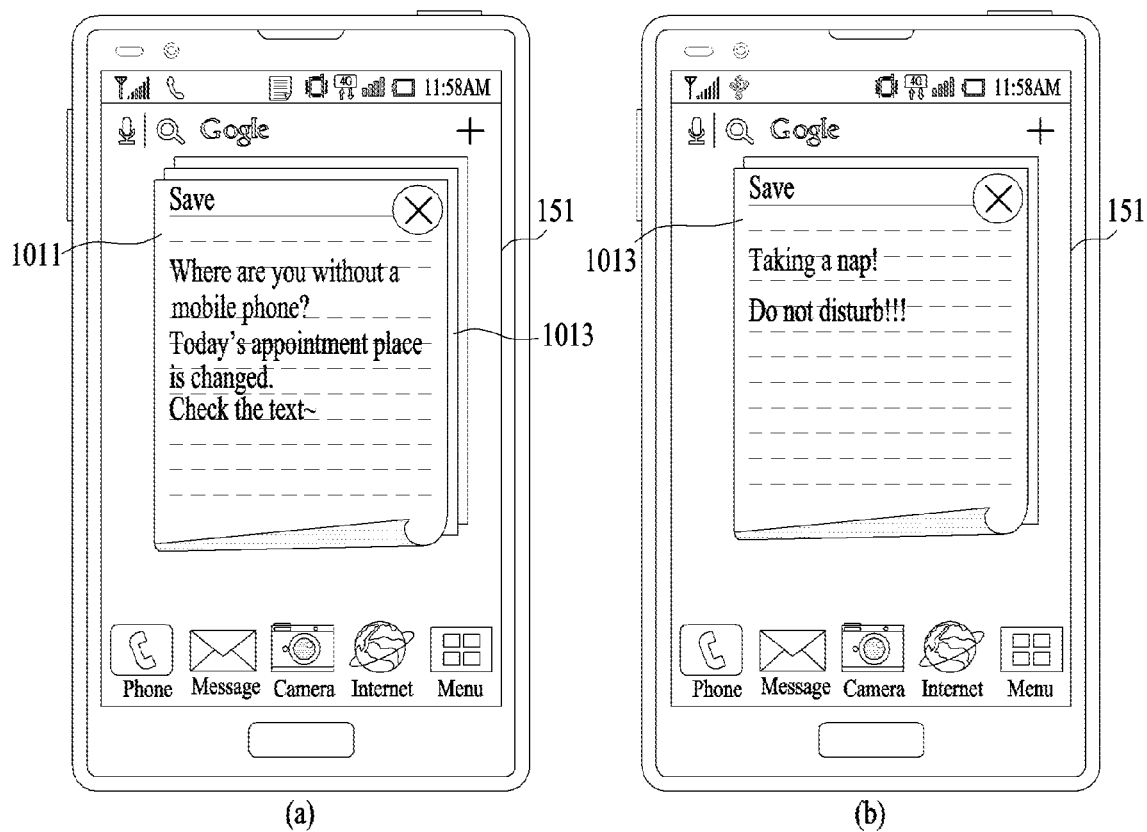
FIG. 10 is a diagram for a case of cancelling a lock screen after saving a temporary memo in a mobile terminal according to one embodiment of the present invention.

FIG. 10 is a diagram for a case of cancelling a lock screen after saving a temporary memo in a mobile terminal according to one embodiment of the present invention.

In FIG. 10, assume a case that 4 temporary memos are saved in a locked screen status. Referring to FIG. 10 (*a*), if a locked screen status is cancelled, temporary memos can be displayed on a home screen in a manner of overlaying each other in order of writing. In doing so, if a temporary memo 1011, which is most recently written and located at a top, is saved or deleted, referring to FIG. 10 (*b*), a next temporary memo 1013 can be displayed.

Meanwhile, a temporary memo can be displayed on a notification region. In this case, the notification region is the region that appears in a manner of sliding in a drag direction if the indicator region is dragged downward. Icons for selecting whether to activate a specific function by toggling and schematic informations on various events can be displayed on the notification region. And, the notification region may be called a quick panel. How to display and utilize a temporary memo on the notification region is described in detail with reference to FIG. 11 as follows.

Figure 11:
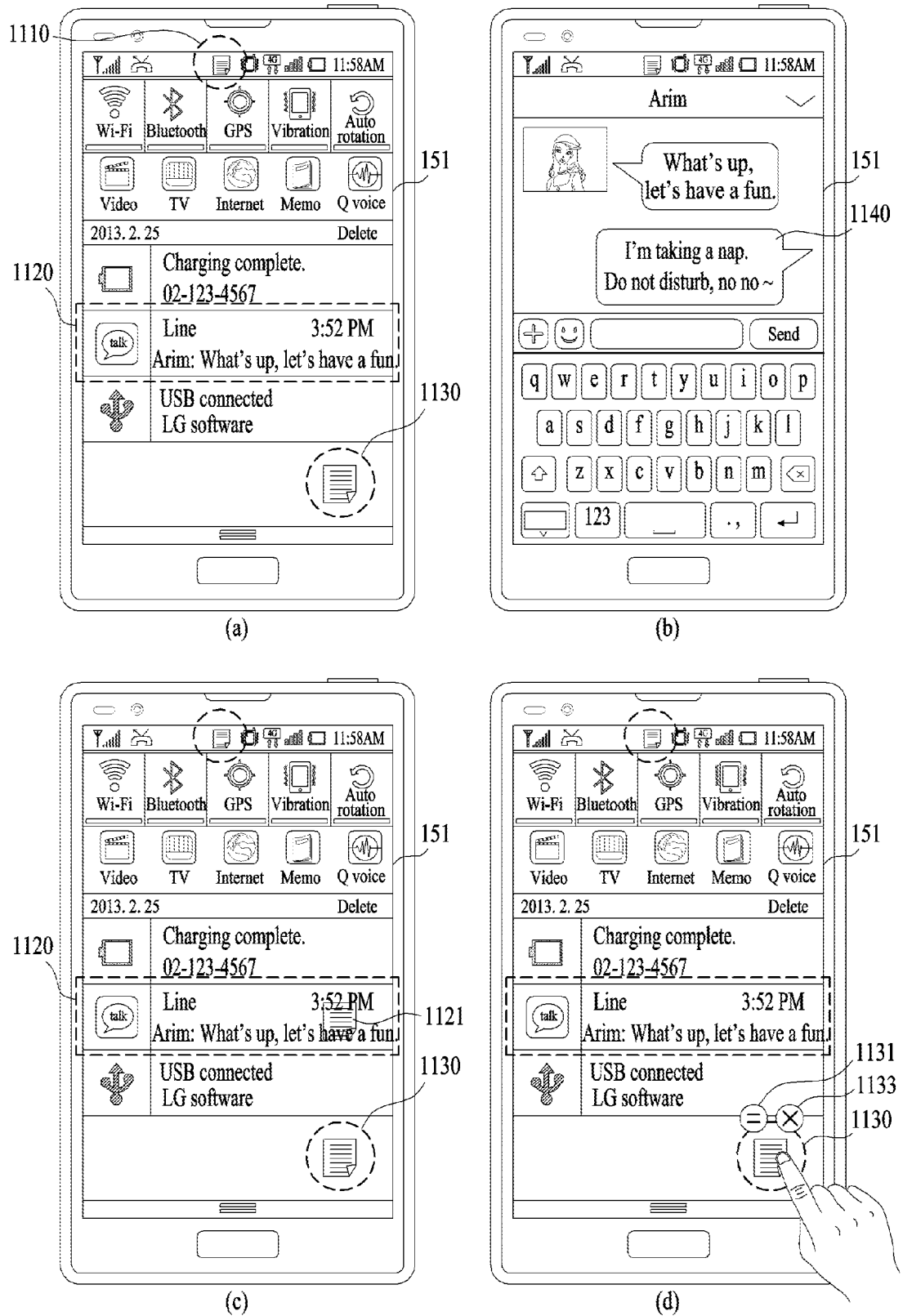
FIG. 11 is a diagram for one example of a method of utilizing a temporary memo displayed on a notification region in a mobile terminal according to one embodiment of the present invention.

FIG. 11 is a diagram for one example of a method of utilizing a temporary memo displayed on a notification region in a mobile terminal according to one embodiment of the present invention.

Referring to FIG. 11 (a), an indicator 1110 can be displayed on an indicator region to indicate that a temporary memo is saved. If a notification region is paged, a temporary memo icon 1130 can be displayed on a right bottom of the notification region. If there is an unchecked message that has received, an item 1120 indicating information on the unchecked message can be displayed on the notification region. In doing so, if a user drags & drops the temporary memo icon 1130 to an item corresponding to the unchecked message, referring to FIG. 11 (b), an SMS application is activated and a substance of the temporary memo can be transmitted as a reply to the unchecked message.

While a smart memo mode is enabled, if a message arrives, the controller 180 sends a reply with a substance of a smart memo. In this case, referring to FIG. 11 (c), an icon 1121 corresponding to the smart memo can be displayed on the unchecked message item 1120 in addition. On the other hand, if the temporary memo icon 1130 is simply touched, a substance of the temporary memo can be enlarged or displayed as a full screen. If the temporary memo icon 1130 is long touched, referring to FIG. 11 (d), a copy icon 1131 and a delete icon 1133 can be displayed around the temporary memo icon 1130. If the delete icon 1133 is selected, the corresponding temporary memo is deleted and the corresponding icon 1130 can disappear from the notification region. In case that the copy icon 1131 is selected, an operation of the mobile terminal is described in detail with reference to FIG. 12 as follows.

Figure 12:
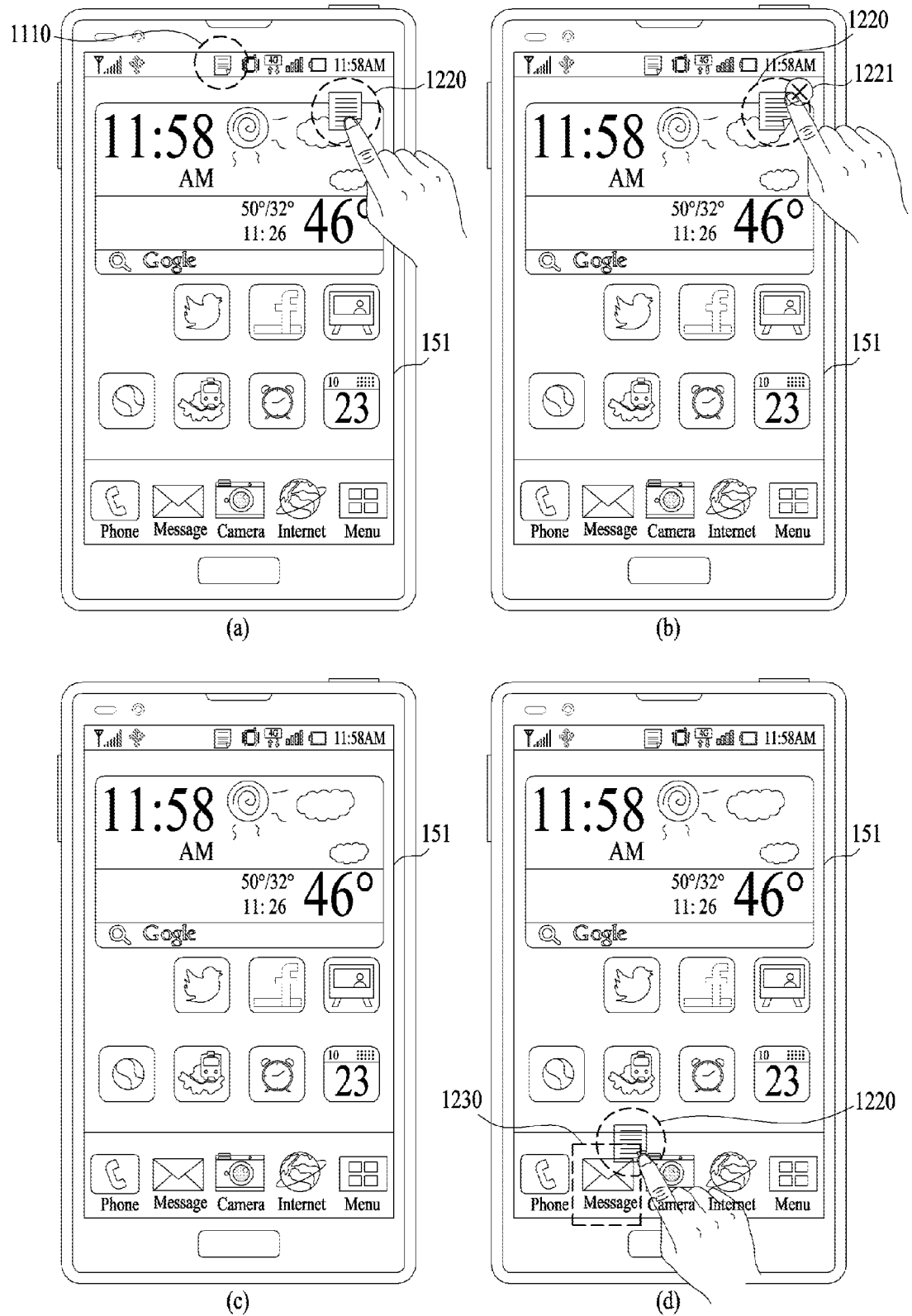
FIG. 12 is a diagram for one example of a method of copying to utilize a temporary memo in a mobile terminal according to one embodiment of the present invention.

FIG. 12 is a diagram for one example of a method of copying and utilizing a temporary memo in a mobile terminal according to one embodiment of the present invention. Assume that FIG. 12 shows a process subsequent to a case of selecting the copy icon 1131 shown in FIG. 11 (d).

Referring to FIG. 12 (a), an indicator 1210 indicating that a temporary memo is saved can be displayed on an indicator region. If the temporary memo is copied, an icon 1220 corresponding to the temporary memo can be displayed on a home screen. A location of the icon 1220 corresponding to the temporary memo can be freely changed depending on a touch & drag input. If the icon 1220 is long touched, referring to FIG. 12 (b), a delete icon 1221 can be displayed. If the delete icon 1221 is selected, referring to FIG. 12 (c), the icon 1220 corresponding to the temporary memo can disappear from the home screen. Yet, since this is just the deletion of the copied temporary memo, the indicator 1210 in the indicator region can keep being displayed. And, an icon in a notification region can be maintained as it is (not shown in the drawing). On the other hand, referring to FIG. 12 (d), if the icon 1220 corresponding to the temporary memo is dragged & dropped to an icon 1230 corresponding to a specific application, a substance of the temporary memo can be utilized as an input information on the corresponding application. For instance, if the specific application includes an SMS application, an SMS application can be activated while a message writing box is automatically filled up with a memo substance.

A saved temporary memo can be utilized in handling an event in response to a selection made by a user in case of an event occurrence. This is described in detail with reference to FIG. 13 as follows.

Figure 13:
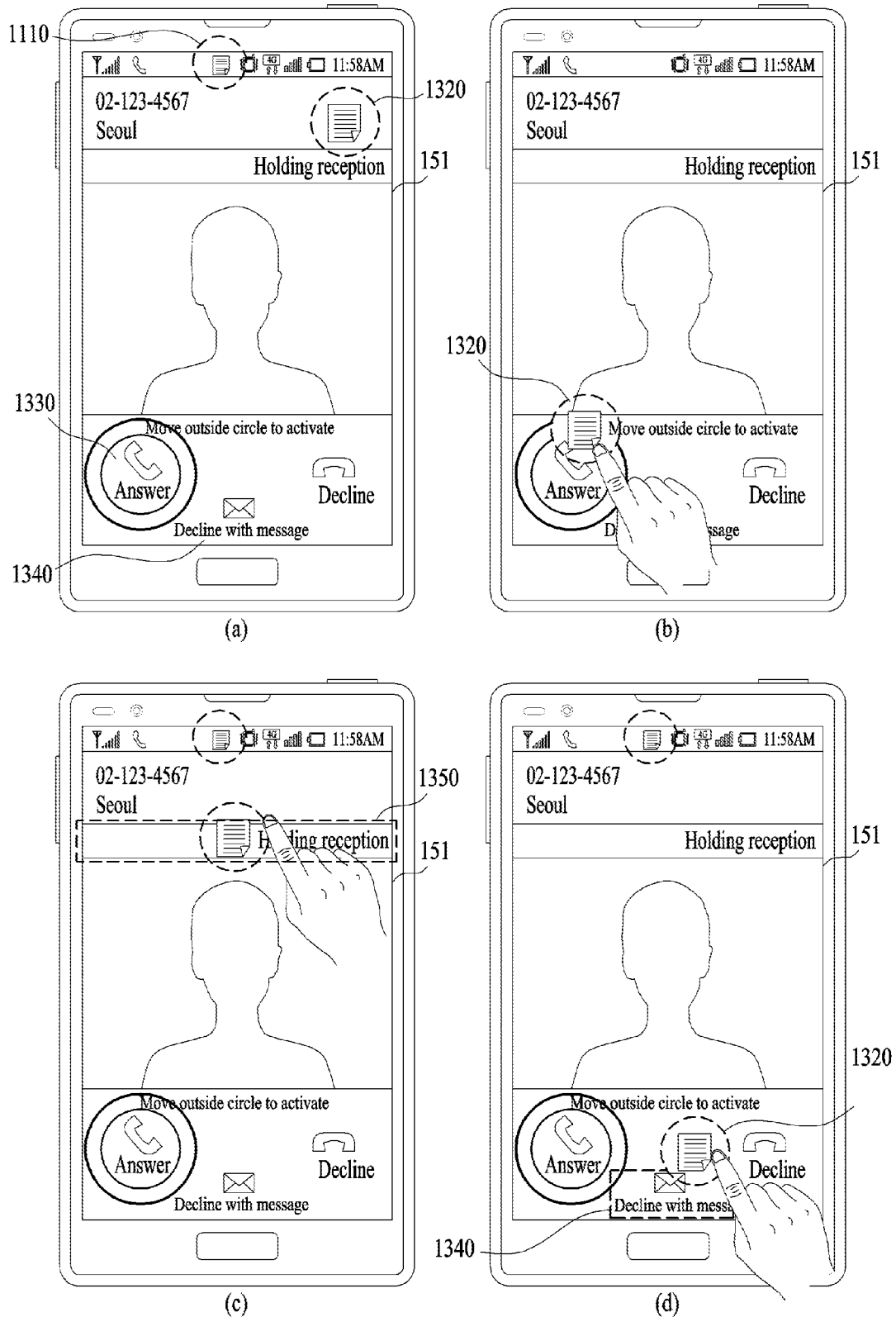
FIG. 13 is a diagram for one example of a method of utilizing a temporary memo in case of an event occurrence in a mobile terminal according to one embodiment of the present invention.

FIG. 13 is a diagram for one example of a method of utilizing a temporary memo in case of an event occurrence in a mobile terminal according to one embodiment of the present invention.

Referring to FIG. 13 (a), an indicator 1310 can be displayed on an indicator region to indicate that a temporary memo is saved. As an incoming call signal is received, a call application is activated and a screen for determining whether to connect a call is then displayed. In doing so, an icon 1320 corresponding to the temporary memo can be displayed as well. On the screen for determining whether to connect a call, a call connecting icon 1330, a message rejection sending icon 1340 and the like can be arranged. In doing so, referring to FIG. 13 (b), if the icon 1320 corresponding to the temporary memo is dragged & dropped to the call connecting icon 1330, the controller 180 connects a call and is then able to control a substance of the temporary memo to be transmitted as audio to a counterpart by TTS.

If a user drags & drops the icon 1320 corresponding to the temporary memo to a lettering region 1350, referring to FIG. 13 (c), the controller 180 can control the substance of the temporary memo to be displayed on a counterpart terminal. In this case, the lettering may mean a counterpart identifying text displayed in the course of a call connection attempt and can be delivered to the counterpart in a manner of being included in a call signal.

If the user drags & drops the icon 1320 corresponding to the temporary memo to the message rejection sending icon 1340, referring to FIG. 13 (d), the controller 180 rejects the call connection and is able to transmit the substance of the temporary memo to the counterpart through SMS.

Meanwhile, according to another example of the present embodiment, a memo similar to the aforementioned memo can be written on a notification region (not shown in the drawing) as well as on a lock screen.

Figure 14:
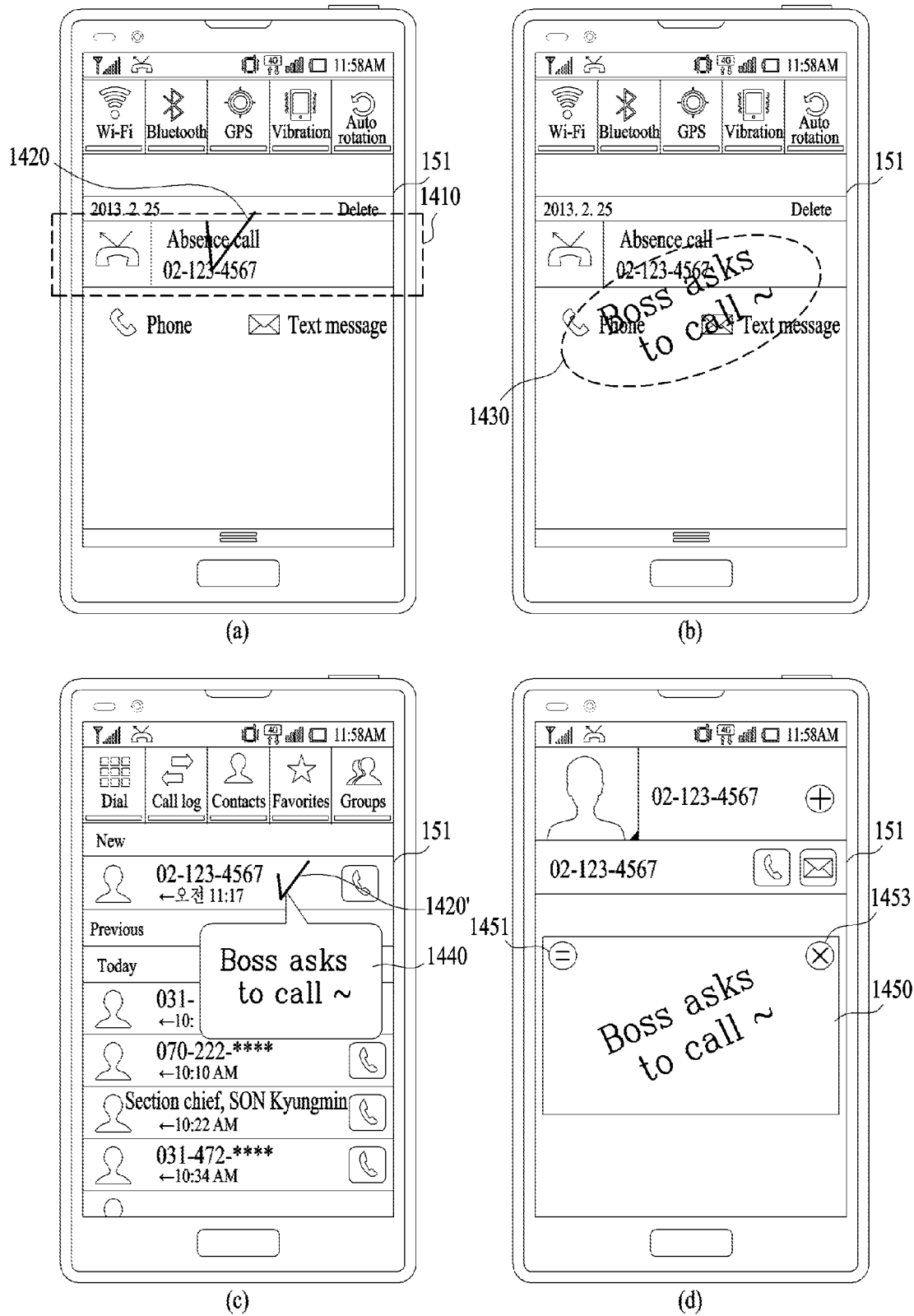
FIG. 14 is a diagram for one example of a method of setting a memo for an event indication displayed on a notification region in a mobile terminal according to another aspect of one embodiment of the present invention.

FIG. 14 is a diagram for one example of a method of setting a memo for an event indication displayed on a notification region in a mobile terminal according to another aspect of one embodiment of the present invention.

Referring to FIG. 14 (a), an item 1410 related to an absence call is displayed on a notification region (not shown in the drawing). In doing so, if a touch-drag input 1420 of a specific pattern is detected from the corresponding item 1410, referring to FIG. 14 (b), the controller 180 can control a later-inputted trace to be saved in a manner of being recognized as a memo 1430. Of course, a separate memo writing region can be displayed instead of overlaying a memo on an existing screen. Instead of a touch-drag input, a menu icon corresponding to the touch-drag input can be displayed on the corresponding icon 1410.

Thereafter, if a recent contact list is entered, referring to FIG. 14 (c), an indicator 1420' can be displayed on an item related to a memo inputted absence call. If the corresponding indicator is selected, a substance of the saved memo can be displayed as a popup window 1440. On the other hand, if an item itself is selected instead of an indicator, referring to FIG. 14 (d), a detailed information of a corresponding contact and a memo substance can be displayed on a separate region 1450. In this case, a copy icon 1451 and a delete icon 1453 can be displayed on the separate region 1450. In this case, since the copy icon 145 and the delete icon 1453 are similar to the former icons 1131 and 1133 described with reference to FIG. 11, redundant description shall be omitted for clarity of the following description.

It will be apparent to those skilled in the art that various modifications and variations can be specified into other form(s) without departing from the spirit or scope of the inventions.

According to one embodiment of the present invention, the above-described methods can be implemented in a program recorded medium as processor-readable codes. The processor-readable media include all kinds of recording devices in which data readable by a processor are saved. The processor-readable media include ROM, RAM, CD-ROM, magnetic tapes, floppy discs, optical data storage devices, and the like for example and also include carrier-wave type implementations (e.g., transmission via Internet).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a mobile terminal, the method comprising:
   displaying, by a controller of the mobile terminal, a lock screen on a touchscreen of the mobile terminal;
   receiving, by the controller, an input of a first command;
   receiving, by the controller, a written memo on the displayed lock screen after the input of the first command is received;
   performing, by the controller, a user authentication;
   if the user authentication is successfully completed, responding to an occurrence of an event using the written memo until cancellation of the display of the lock screen;
   cancelling the display of the lock screen, displaying an object corresponding to the written memo at a prescribed location wherein the prescribed location includes at least an indicator region at a top end of the touchscreen or a notification region displayed in response to an input of a second command at the indicator region;
   receiving an input of a third command at the object displayed at the notification region; and
   copying the object to a home screen.

2. The method of claim 1, wherein the event comprises one selected from the group consisting of a message reception, a call signal reception and an SNS (Social Network Service) update information reception.

3. The method of claim 1, wherein the user authentication is performed through at least one selected from the group consisting of a facial recognition, a fingerprint recognition, a touch pattern recognition and a password input.

4. The method of claim 1, further comprising setting at least one selected from the group consisting of a type of the event to respond to, a designation of an application related to the event and a function restricted until the cancellation of the display of the lock screen.

5. The method of claim 4, wherein the function restricted until the cancellation of the display of the lock screen comprises at least an audio output or a haptic output.

6. The method of claim 1, further comprising:
   shifting the object copied to the home screen to a specific entity displayed on the home screen in response to a fourth command; and
   inserting a substance of the memo as input information to an application corresponding to the specific entity.

7. The method of claim 1, wherein the written memo is written through at least one selected from the group consisting of a text input through a virtual keypad, a voice recognition, a handwriting recognition and a creation of an image corresponding to a touch trace.

8. A mobile terminal comprising:
   a touchscreen; and
   a controller configured to:
   display a lock screen on the touchscreen;
   receive an input of a first command;
   receive a written memo on the displayed lock screen after the input of the first command is received;
   perform a user authentication;
   if the user authentication is successfully completed, respond to an occurrence of an event using the written memo until cancellation of the display of the lock screen;
   wherein, if the display of the lock screen is cancelled, the controller displays an object corresponding to the written memo at a prescribed location wherein the prescribed location includes at least an indicator region at a top end of the touchscreen or a notification region displayed in response to an input of a second command at the indicator region; and
   wherein, if a third command is input at the object displayed at the notification region, the controller copies the object to a home screen.

9. The mobile terminal of claim 8, wherein the event comprises one selected from the group consisting of a message reception, a call signal reception and an SNS (Social Network Service) update information reception.

10. The mobile terminal of claim 8, wherein the user authentication is performed through at least one selected from the group consisting of a facial recognition, a fingerprint recognition, a touch pattern recognition and a password input.

11. The mobile terminal of claim 8,
    wherein the controller is further configured to respond to the occurrence of the event in accordance with preset event setup information, and
    wherein the preset event setup information comprises at least one selected from the group consisting of a type of the event to respond to, a designation of an application related to the event and a function restricted until the cancellation of the display of the lock screen.

12. The mobile terminal of claim 11, further comprising:
    an audio output unit; and
    a haptic output unit,
    wherein the function restricted until the cancellation of the display of the lock screen comprises at least an audio output through the audio output unit or a vibration output through the haptic output unit.

13. The mobile terminal of claim 8, wherein, if a fourth command for shifting the object copied to the home screen to a specific entity displayed on the home screen is input, the controller inserts a substance of the memo as input information to an application corresponding to the specific entity.

14. The mobile terminal of claim 13, wherein the written memo is written through at least one selected from the group consisting of a text input through a virtual keypad, a voice recognition, a handwriting recognition and a creation of an image corresponding to a touch trace.

\* \* \* \* \*